(12) United States Patent
Kamitake et al.

(10) Patent No.: US 12,206,111 B2
(45) Date of Patent: Jan. 21, 2025

(54) CATHODE MATERIAL AND BATTERY USING SAME

(71) Applicant: Panasonic Intellectual Property Management Co., Ltd., Osaka (JP)

(72) Inventors: Hiroki Kamitake, Osaka (JP); Akihiro Sakai, Nara (JP); Izuru Sasaki, Kyoto (JP); Yuta Sugimoto, Hyogo (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 18/142,506

(22) Filed: May 2, 2023

(65) Prior Publication Data

US 2023/0268504 A1 Aug. 24, 2023

Related U.S. Application Data

(60) Division of application No. 16/930,405, filed on Jul. 16, 2020, now Pat. No. 11,682,764, which is a
(Continued)

(30) Foreign Application Priority Data

Jan. 26, 2018 (JP) .................................. 2018-011525

(51) Int. Cl.
*H01M 4/58* (2010.01)
*H01M 4/136* (2010.01)
(Continued)

(52) U.S. Cl.
CPC ......... *H01M 4/5825* (2013.01); *H01M 4/136* (2013.01); *H01M 4/62* (2013.01);
(Continued)

(58) Field of Classification Search
CPC .. H01M 4/5825; H01M 4/62; H01M 10/0562; H01M 10/0525;
(Continued)

(56) References Cited

U.S. PATENT DOCUMENTS

| 4,352,869 A | 10/1982 | Mellors |
| 5,506,073 A | 4/1996 | Angell et al. |

(Continued)

FOREIGN PATENT DOCUMENTS

| CN | 105254184 A | 1/2016 |
| CN | 105680048 A | 6/2016 |

(Continued)

OTHER PUBLICATIONS

International Search Report of PCT application No. PCT/JP2018/045584 dated Mar. 19, 2019.
(Continued)

*Primary Examiner* — Laura Weiner
(74) *Attorney, Agent, or Firm* — Rimon P.C.

(57) ABSTRACT

The present disclosure provides a cathode material which has improved charge/discharge efficiency; and a battery using the same. The cathode material includes a cathode active material and a first solid electrolyte material; and the first solid electrolyte material contains Li, M and X; however, does not include sulfur. M represents at least one element that is selected from the group consisting of metalloid elements and metal elements other than Li. X represents at least one selected from the group consisting of Cl and Br, and I. The cathode active material includes lithium iron phosphate.

3 Claims, 1 Drawing Sheet

Related U.S. Application Data continuation of application No. PCT/JP2018/045584, filed on Dec. 12, 2018.

(51) Int. Cl.

| | | |
|---|---|---|
| *H01M 4/62* | (2006.01) | |
| *H01M 10/052* | (2010.01) | |
| *H01M 10/0525* | (2010.01) | |
| *H01M 10/0562* | (2010.01) | |
| *H01M 50/431* | (2021.01) | |
| *H01M 4/02* | (2006.01) | |

(52) U.S. Cl.
CPC ..... *H01M 10/052* (2013.01); *H01M 10/0525* (2013.01); *H01M 10/0562* (2013.01); *H01M 50/431* (2021.01); *H01M 2004/028* (2013.01); *H01M 2300/0068* (2013.01); *H01M 2300/008* (2013.01); *H01M 2300/0094* (2013.01)

(58) Field of Classification Search
CPC ... H01M 2300/008; H01M 2300/0068; H01M 2004/028; H01M 50/431
See application file for complete search history.

(56) References Cited

U.S. PATENT DOCUMENTS

| | | | |
|---|---|---|---|
| 5,714,279 A | 2/1998 | Zajac, Jr. et al. | |
| 6,428,935 B1 | 8/2002 | Takada et al. | |
| 9,160,034 B2 | 10/2015 | Kato et al. | |
| 10,008,735 B2 | 6/2018 | Ohtomo et al. | |
| 2004/0151986 A1 | 8/2004 | Park et al. | |
| 2010/0273062 A1* | 10/2010 | Tsuchida | H01M 10/0562 |
| | | | 429/304 |
| 2011/0027661 A1* | 2/2011 | Okazaki | H01M 4/5825 |
| | | | 429/209 |
| 2011/0045355 A1 | 2/2011 | Ichikawa | |
| 2011/0300444 A1 | 12/2011 | Nakamura | |
| 2012/0052396 A1* | 3/2012 | Tsuchida | H01M 4/5825 |
| | | | 429/304 |
| 2012/0301796 A1 | 11/2012 | Ohtomo et al. | |
| 2012/0308900 A1 | 12/2012 | Ogasa | |
| 2013/0260258 A1* | 10/2013 | Tsuchida | H01M 10/0562 |
| | | | 429/304 |
| 2013/0295464 A1 | 11/2013 | Yanagi et al. | |
| 2015/0147659 A1 | 5/2015 | Kato | |
| 2015/0228966 A1 | 8/2015 | Kintaka | |
| 2016/0103232 A1 | 4/2016 | Ouspenski et al. | |
| 2016/0149259 A1 | 5/2016 | Osada et al. | |
| 2016/0156064 A1 | 6/2016 | Miyashita et al. | |
| 2016/0204467 A1 | 7/2016 | Nogami et al. | |
| 2016/0248119 A1 | 8/2016 | Kato | |
| 2016/0268630 A1 | 9/2016 | Tsukada et al. | |
| 2016/0285078 A1 | 9/2016 | Deschamps et al. | |
| 2016/0308210 A1 | 10/2016 | Sakuda et al. | |
| 2016/0359192 A1 | 12/2016 | Homma et al. | |
| 2016/0359193 A1 | 12/2016 | Yi et al. | |
| 2017/0040637 A1 | 2/2017 | Ceder et al. | |
| 2017/0179481 A1 | 6/2017 | Yamada et al. | |
| 2017/0187066 A1 | 6/2017 | Tsujimura et al. | |
| 2017/0222257 A1 | 8/2017 | Miyashita et al. | |
| 2017/0229734 A1 | 8/2017 | Furukawa et al. | |
| 2017/0288281 A1 | 10/2017 | Chiang et al. | |
| 2017/0309964 A1 | 10/2017 | Iwamoto | |
| 2018/0183065 A1 | 6/2018 | Sasaki | |
| 2018/0269521 A1 | 9/2018 | Ohtomo et al. | |
| 2019/0067736 A1 | 2/2019 | Yoshioka et al. | |
| 2019/0088995 A1 | 3/2019 | Asano et al. | |
| 2019/0097266 A1 | 3/2019 | Yamamoto et al. | |
| 2020/0212481 A1 | 7/2020 | Nagamine et al. | |
| 2020/0328454 A1 | 10/2020 | Sakai et al. | |
| 2020/0328455 A1 | 10/2020 | Sakai et al. | |
| 2020/0328457 A1 | 10/2020 | Sakai et al. | |
| 2020/0328460 A1 | 10/2020 | Asano et al. | |
| 2020/0328461 A1 | 10/2020 | Asano et al. | |
| 2020/0328462 A1 | 10/2020 | Asano et al. | |
| 2020/0328464 A1 | 10/2020 | Asano et al. | |
| 2020/0328465 A1 | 10/2020 | Sakaida et al. | |
| 2020/0328468 A1 | 10/2020 | Sakaida et al. | |
| 2020/0328469 A1 | 10/2020 | Asano et al. | |
| 2020/0335817 A1 | 10/2020 | Asano et al. | |
| 2020/0350615 A1 | 11/2020 | Sakaida et al. | |
| 2020/0350621 A1 | 11/2020 | Sugimoto et al. | |
| 2020/0350622 A1 | 11/2020 | Sakaida et al. | |
| 2020/0350624 A1 | 11/2020 | Sasaki et al. | |
| 2021/0151791 A1 | 5/2021 | Oshima et al. | |
| 2021/0151792 A1 | 5/2021 | Oshima et al. | |

FOREIGN PATENT DOCUMENTS

| | | |
|---|---|---|
| CN | 107611340 A | 1/2018 |
| CN | 108701860 A | 10/2018 |
| EP | 2916381 B1 | 6/2016 |
| EP | 3043411 A1 | 7/2016 |
| EP | 3428929 A1 | 1/2019 |
| EP | 3496202 A1 | 6/2019 |
| EP | 3736827 A1 | 11/2020 |
| EP | 3736829 A1 | 11/2020 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| EP | 3863028 A1 | 8/2021 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | H11-238528 A | 8/1999 |
| JP | 2001-052733 | 2/2001 |
| JP | 2001-052733 | 2/2001 |
| JP | 2004-235155 A | 8/2004 |
| JP | 2006-244734 | 9/2006 |
| JP | 2006-244734 A | 9/2006 |
| JP | 2008-021556 A | 1/2008 |
| JP | 2008-060033 | 3/2008 |
| JP | 2008-234988 | 10/2008 |
| JP | 2011-129312 | 6/2011 |
| JP | 2011-253762 | 12/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-111954 | 6/2017 |
| JP | 2017-117753 A | 6/2017 |
| JP | 2017-518622 A | 7/2017 |
| JP | 2017-152324 A | 8/2017 |
| JP | 2017-199668 | 11/2017 |
| JP | 6222134 B2 | 11/2017 |
| JP | 2017-224474 A | 12/2017 |
| WO | 2000/028608 | 5/2000 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2015/136623 | 9/2015 |
| WO | 2017/047015 | 3/2017 |
| WO | 2017/108105 A1 | 6/2017 |
| WO | 2017/154766 A1 | 9/2017 |

(56) References Cited

FOREIGN PATENT DOCUMENTS

| | | |
|---|---|---|
| WO | 2017/154922 A1 | 9/2017 |
| WO | 2018/025582 A1 | 2/2018 |

OTHER PUBLICATIONS

Andreas Bohnsack et al., "The Bromides Li3MBr6 (M=Sm-Lu, Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCI6 (M=Tb-Lu, Y, Sc): Synthesis, Crystal Structures, and Ionic Motion", Journal of Inorganic and General Chemistry, Jul. 1997, vol. 623/Issue 7. pp. 1067-1073.
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M = Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.
William D. Richards et al., "Interface Stability in Solid-State Batteries", Chemistry of Materials, 2016, vol. 28, Dec. 7, 2015, pp. 266-273.
Fudong Han et al. "A Battery Made from a Single Material", Advanced Materials, 27 (2015), pp. 3473-3483.
English Translation of Chinese Search Report dated Jan. 12, 2024 for the related Chinese Patent Application No. 201880085583.9.
Notice of Allowance issued in U.S. Appl. No. 16/930,405, dated Mar. 10, 2023.
Final Office Action issued in U.S. Appl. No. 16/930,405, dated Jan. 26, 2023.
Non-Final Office Action issued in U.S. Appl. No. 16/930,405, dated Oct. 14, 2022.
Extended European Search Report dated Feb. 11, 2021 for the related European Patent Application No. 18902871.5.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
International Search Report of International Application No. PCT/JP2018/046264 dated Mar. 19, 2019.
International Search Report of International Application No. PCT/JP2018/045588 dated Mar. 19, 2019.
International Search Report of International Application No. PCT/JP2018/042060 dated Jan. 29, 2019.
International Search Report of International Application No. PCT/JP2019/040062 dated Dec. 24, 2019.
International Search Report of International Application No. PCT/JP2019/040063 dated Dec. 24, 2019.
Andreas Bohnsack et al., "Ternary Chlorides of the Rare-Earth Elements with Lithium, Li3MCI6 (M=Tb-Lu, Y, Sc): Synthesis, Crystal Structures, and Ionic Motion", Journal of Inorganic and General Chemistry, Sep. 1997, vol. 623/Issue 7, pp. 1067-1073.
The Extended European Search Report dated Feb. 11, 2021 for the related European Patent Application No. 18902871.5.
The Extended European Search Report dated Feb. 10, 2021 for the related European Patent Application No. 18902731.1.
The Extended European Search Report dated Feb. 17, 2021 for the related European Patent Application No. 18902279.1.
The Extended European Search Report dated Dec. 20, 2021 for the related European Patent Application No. 19891097.8.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 4, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.

(56) References Cited

OTHER PUBLICATIONS

Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICl6 (MI = Li, Na, Ag; MIII= In, Y)." Zeitschrift fur anorganhische und allgemeine Chemie 613.7 (1992): 26-30 (Year: 1992).

\* cited by examiner

CATHODE MATERIAL AND BATTERY USING SAME

CROSS REFERENCE

This application is a Divisional Application of U.S. application Ser. No. 16/930,405, filed on Jul. 16, 2020, now U.S. Pat. No. 11,682,764, which is a Continuation of International Application No. PCT/JP2018/045584, dated Dec. 12, 2018, which claims the benefit of Japanese Application No. 2018-011525, filed Jan. 26, 2018, respectively, the entire contents of each are hereby incorporated by reference.

1. TECHNICAL FIELD

The present disclosure relates to a cathode material and a battery using the same.

2. DESCRIPTION OF THE RELATED ART

Patent Literature 1 discloses a battery using, as a solid electrolyte, a halide including indium.

CITATION LIST

Patent Literature

Patent Literature 1: Japanese Patent Application Publication No. 2006-244734

SUMMARY

In the prior art, further improvement in a charge/discharge efficiency of a battery is desired.

The cathode material according to one aspect of the present disclosure comprises:
a cathode active material and a first solid electrolyte material,
wherein
the first solid electrolyte material includes Li, M, and X, and does not include sulfur;
M represents at least one selected from the group consisting of metalloid elements and metal elements other than Li;
X represents at least one selected from the group consisting of Cl and Br, and I; and
the cathode active material includes lithium iron phosphate.

According to the present disclosure, the charge/discharge efficiency of the battery can be improved.

DETAILED DESCRIPTION OF THE EMBODIMENTS

Figure 1:
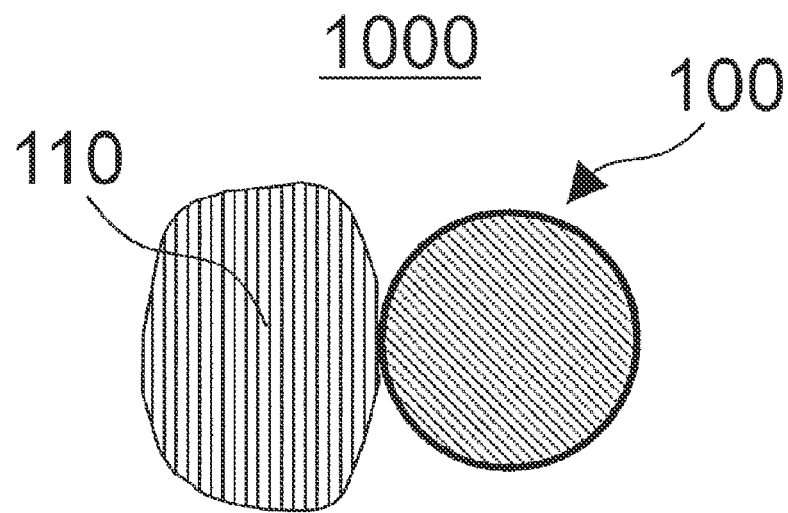
FIG. 1 shows a cross-sectional view of a cathode material 1000 in a first embodiment.

Hereinafter, embodiments of the present disclosure will be described with reference to the drawings.

First Embodiment

The cathode material in the first embodiment includes a cathode active material and a first solid electrolyte material.

The first solid electrolyte material is a material represented by the following composition formula (1).

$$Li_\alpha M_\beta X_\gamma \quad \text{Formula (1)}$$

where
$\alpha$, $\beta$, and $\gamma$ are each independently a value greater than zero.
M includes at least one selected from the group consisting of metalloid elements and metal elements other than Li.
X includes at least one of Cl and Br, and I.
The cathode active material includes lithium iron phosphate. For example, the cathode active material includes $LiFePO_4$.

According to the above configuration, a charge/discharge efficiency of a battery can be improved.

The halide solid electrolyte material exhibits good ionic conductivity. In particular, the first solid electrolyte material, which is a halide solid electrolyte material including I, exhibits higher ionic conductivity. As a result, for example, the first solid electrolyte material would be a prospective material which allows an all-solid secondary battery to operate at high output.

According to Patent Literature 1, in an all-solid secondary battery including a solid electrolyte including indium, it is preferable that an electric potential of the cathode active material with respect to Li is 3.9 V or less on average, thereby a film formed of a decomposition product due to oxidative decomposition is well formed and a good charge/discharge characteristic is provided. In addition, Patent Literature 1 discloses general layered transition metal oxide cathodes such as $LiCoO_2$ and $LiNi_{0.8}Co_{0.15}Al_{0.05}O_2$ as cathode active materials having the electric potential thereof with respect to Li of 3.9 V or less on average. However, Patent Literature 1 fails to disclose detailed mechanism of the oxidative decomposition.

On the other hand, the present inventors found following matters. In a battery using a halide solid electrolyte (namely, the first solid electrolyte material) including I in a cathode material, even if the cathode active materials having the electric potential thereof with respect to Li of 3.9 V or less on average is used, the halide solid electrolyte undergoes oxidative decomposition during charging. The oxidative decomposition causes a problem of lowering the charge/discharge efficiency of the battery. The main reason therefor is an oxidation reaction of I included in the halide solid electrolyte.

Specifically, it is conceived that, in addition to a normal charging reaction in which lithium and electrons are extracted from the cathode active material in the cathode material, a side reaction in which electrons are extracted from the halide solid electrolyte in contact with the cathode active material occurs. It is conceived that, as a result, charges are consumed for the side reaction to lower the charge/discharge efficiency.

In addition, it is conceived that an oxide layer having poor lithium ion conductivity is formed between the cathode active material and the halide solid electrolyte due to the oxidation reaction of the halide solid electrolyte, and that the oxide layer functions as a large interface resistance in the electrode reaction of the cathode.

Therefore, in order to operate the all-solid secondary battery including the halide solid electrolyte at a high output, it is necessary that a halide solid electrolyte including I having high ionic conductivity is introduced into the cathode material, and that the oxidation reaction of I is suppressed. In order to solve this problem, it is necessary to use a cathode active material capable of providing a good charge/ discharge characteristic in a low potential region where the oxidation reaction of the halide solid electrolyte does not occur.

In the configuration of the present disclosure, a lithium iron phosphate of the cathode active material that provides a good charge/discharge characteristic in a low potential region is introduced into the cathode material, thereby suppressing the oxidation reaction of I included in the halide solid electrolyte. As a result, the side reaction of the halide solid electrolyte does not occur, and the charge/discharge efficiency can be improved. In addition, since no side reaction occurs, the formation of the oxide layer is suppressed, and the interfacial resistance of the electrode reaction can be reduced.

The term "metalloid elements" used in the present specification are B, Si, Ge, As, Sb, and Te.

The term "metal elements" used in the present specification includes
(i) all elements included in Group 1 to Group 12 of the Periodic Table (except for hydrogen), and
(ii) all elements included in Group 13 to Group 16 of the Periodic Table (except for B, Si, Ge, As, Sb, Te, C, N, P, O, S, and Se).

In other words, each of the metal elements become a cation, if the metal elements form an inorganic compound with a halogen compound.

In the composition formula (1), M may include Y (namely, yttrium).

In other words, the first solid electrolyte material may include Y as the metal element M.

According to the above configuration, the ionic conductivity of the first solid electrolyte material can be further improved. Thereby, the charge/discharge efficiency of the battery can be further improved.

The first solid electrolyte material including Y may be, for example, a compound represented by a composition formula $Li_aMe_bY_cX_6$ ($a+mb+3c=6$ and $c>0$ are satisfied) (Me: at least one of metalloid elements and metal elements other than Li and Y) (m: valence of Me).

As Me, at least one selected from the group consisting of Mg, Ca, Sr, Ba, Zn, Sc, Al, Ga, Bi, Zr, Hf, Ti, Sn, Ta, and Nb may be used.

According to the above configuration, the ionic conductivity of the first solid electrolyte material can be further improved.

The first solid electrolyte material may be $Li_3YBrCl_4I$ or $Li_3YBr_2Cl_2I_2$.

According to the above configuration, the ionic conductivity of the first solid electrolyte material can be further improved.

The first solid electrolyte material may include $Li_3YBr_2Cl_2I_2$.

$Li_3YBr_2Cl_2I_2$ has particularly high ionic conductivity among halide solid electrolytes including I, and can improve the output density of the battery.

The first solid electrolyte material may be a material represented by the following composition formula (B1).

$$Li_{6-3d}Y_dX_6 \qquad \text{Formula (B1)}$$

where, in the composition formula (B1), X includes at least one of Cl and Br, and I.

In the composition formula (B1), $0<d<2$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (B2).

$$Li_3YX_6 \qquad \text{Formula (B2)}$$

where, in the composition formula (B2), X includes at least one of Cl and Br, and I. In other words, in the formula (B1), d=1 may be satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (B3).

$$Li_{3-3\delta+a}Y_{1+\delta-a}Me_aCl_{6-x-y}Br_xI_y \qquad \text{Formula (B3)}$$

where, in the composition formula (B3), Me is at least one selected from the group consisting of Mg, Ca, Sr, Ba, and Zn.

In addition, in the composition formula (B3), $-1<\delta<2$;

$0<a<3$;

$0<(3-3\delta+a)$;

$0<(1+\delta-a)$;

$0 \leq x \leq 6$;

$0<y \leq 6$; and $(x+y)<6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (B4).

$$Li_{3-3\delta}Y_{1+\delta-a}Me_aCl_{6-x-y}Br_xI_y \qquad \text{Formula (B4)}$$

where, in the composition formula (B4), Me is at least one selected from the group consisting of Al, Sc, Ga, and Bi.

In the composition formula (B4), $-1<\delta<1$;

$0<a<2$;

$0<(1+\delta-a)$;

$0 \leq x<6$;

$0<y \leq 6$; and $(x+y)<6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (B5).

$$Li_{3-3\delta-a}Y_{1+\delta-a}Me_aCl_{6-x-y}Br_xI_y \qquad \text{Formula (B5)}$$

where, in the composition formula (B5), Me is at least one selected from the group consisting of Zr, Hf, and Ti.

In the composition formula (B5), $-1<\delta<1$;

$0<a<1.5$;

$0<(3-3\delta-a)$;

$0<(1+\delta-a)$;

$0\le x<6$;

$0<y\le 6$; and $(x+y)<6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (B6).

$$Li_{3-3\delta-2a}Y_{1+\delta-a}Me_aCl_{6-x-y}Br_xI_y \quad \text{Formula (B6)}$$

where, in the composition formula (B6), Me is at least one selected from the group consisting of Ta and Nb.

In the composition formula (B6), $-1<\delta<1$;

$0<a<1.2$;

$0<(3-3\delta-2a)$;

$0<(1+\delta-a)$;

$0\le x<6$;

$0<y\le 6$; and $(x+y)<6$ are satisfied.

According to the above configuration, the ionic conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, Li (Al, Ga, In)$X_4$, or $Li_3$(Al, Ga, In)$X_6$ (X includes at least one of Cl and Br, and I) can be used.

FIG. 1 shows a cross-sectional view of a cathode material 1000 in the first embodiment.

The cathode material 1000 in the first embodiment includes first solid electrolyte particles 100 and cathode active material particles 110.

The shape of each of the first solid electrolyte particles 100 in the first embodiment is not limited, and may be, for example, a needle shape, a spherical shape, or an elliptical spherical shape.

For example, when the shape of the first solid electrolyte particles 100 in the first embodiment is spherical, the median diameter of the first solid electrolyte particles 100 may be not more than 100 μm.

If the median diameter is larger than 100 μm, there is a possibility that a good dispersion state of the cathode active material particles 110 and the first solid electrolyte particles 100 cannot be formed in the cathode material. As a result, the charge/discharge characteristic is lowered.

In addition, in the first embodiment, the median diameter may be not more than 10 μm.

According to the above configuration, the cathode active material particles 110 and the first solid electrolyte particles 100 can be well dispersed in the cathode material.

In addition, in the first embodiment, the median diameter of the first solid electrolyte particles 100 may be smaller than the median diameter of the cathode active material particles 110.

According to the above configuration, the first solid electrolyte particles 100 and the cathode active material particles 110 can be dispersed better in the electrode.

The median diameter of the cathode active material particles 110 may be not less than 0.1 μm and not more than 100 μm.

If the median diameter of the cathode active material particles 110 is smaller than 0.1 μm, the cathode active material particles 110 and the first solid electrolyte particles 100 are not well dispersed in the cathode material. As a result, the charge/discharge characteristic of the battery can be lowered.

In addition, if the median diameter of the cathode active material particles 110 is larger than 100 μm, the diffusion of lithium in the cathode active material particles 110 is made slow. As a result, the battery may be difficult to operate at a high output.

The median diameter of the cathode active material particles 110 may be larger than the median diameter of the first solid electrolyte particles 100. Thereby, the cathode active material particles 110 and the first solid electrolyte particles 100 can be well dispersed.

In the cathode material 1000 according to the first embodiment, the first solid electrolyte particles 100 and the cathode active material particles 110 may be in contact with each other, as shown in FIG. 1.

In addition, the cathode material 1000 in the first embodiment may include a plurality of the first solid electrolyte particles 100 and a plurality of the cathode active material particles 110.

Further, in the cathode material 1000 in the first embodiment, the content of the first solid electrolyte particles 100 may be the same as or different from the content of the cathode active material particles 110.

In the first embodiment, a surface of each of the cathode active material particles 110 may be coated with a carbon material. By coating the surface of the lithium iron phosphate with the carbon material, the cathode material can be provided with good electronic conductivity, and the battery can be operated at a higher output.

(Manufacturing Method of First Solid Electrolyte Material)

The first solid electrolyte material in the first embodiment may be manufactured by the following method, for example.

In consideration of the composition ratio of the product, binary halide raw material powders are prepared. For example, if $Li_3YCl_6$ is produced, LiCl and $YCl_3$ are prepared at a molar ratio of 3:1.

At this time, by selecting the kinds of raw material powders, the elements "M", "Me", and "X" in the above-described composition formula can be determined. In addition, by adjusting the raw material powders, the blending ratio, and the synthesis process, the values of "α", "β", "γ", "d", "δ", "a", "x", and "y" are determined.

Raw material powders are mixed well. Next, the raw material powders are ground using a mechanochemical milling method. In this way, the raw material powders react to provide the first solid electrolyte material. Alternatively, the raw material powders are mixed well, and then, sintered in vacuum to provide the first solid electrolyte material.

Thereby, the above-mentioned solid electrolyte material including a crystal phase is provided.

The configuration of the crystal phase (namely, the crystal structure) in a solid electrolyte material can be determined by selecting the reaction method and reaction conditions of the raw material powders.

Second Embodiment

Hereinafter, the second embodiment will be described. The description which has been set forth in the above-described first embodiment is omitted as appropriate.

Figure 2:
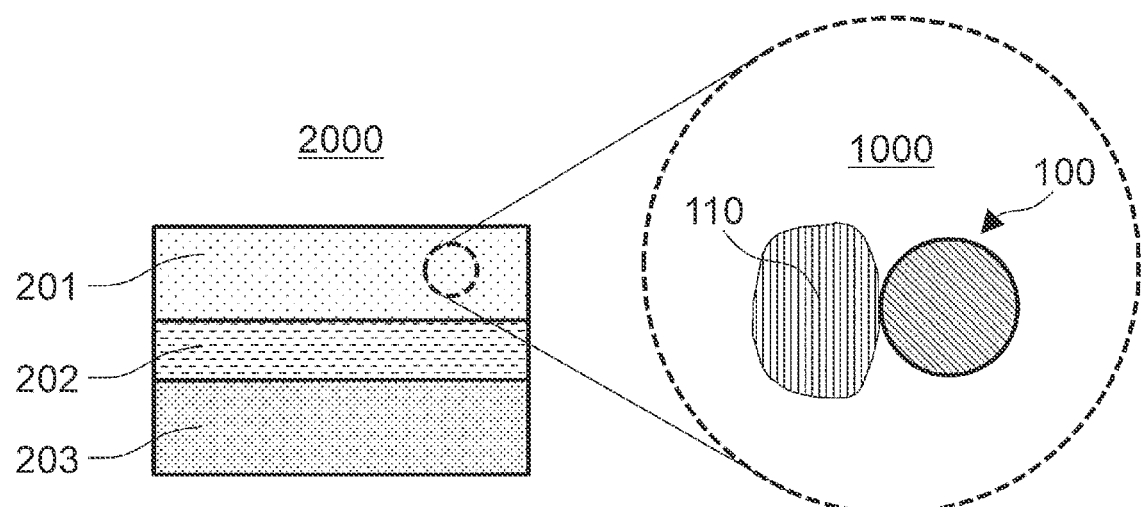
FIG. 2 shows a cross-sectional view of a battery 2000 in a second embodiment.

FIG. 2 is a cross-sectional view showing a schematic configuration of a battery 2000 in the second embodiment.

The battery 2000 in the second embodiment comprises a cathode 201, an electrolyte layer 202, and an anode 203.

The cathode 201 includes the cathode material (for example, the cathode material 1000) in the first embodiment.

The electrolyte layer 202 is disposed between the cathode 201 and the anode 203.

According to the above configuration, the charge/discharge efficiency of a battery can be improved.

In the cathode 201, a volume ratio Vp representing a volume of the cathode active material particles 110 to the total volume of the cathode active material particles 110 and the first solid electrolyte particles 110 may be not less than 0.3 and not more than 0.95. If the volume ratio Vp is less than 0.3, it may be difficult to ensure the energy density of the battery sufficiently. On the other hand, if the volume ratio Vp is more than 0.95, it may be difficult to operate the battery at a high output.

The thickness of the cathode 201 may be not less than 10 μm and not more than 500 μm. If the thickness of the cathode 201 is less than 10 μm, it may be difficult to ensure the battery energy density sufficiently. If the thickness of the cathode 201 is more than 500 μm, it may be difficult to operate at a high output.

The electrolyte layer 202 is a layer including an electrolyte material. The electrolyte material is, for example, a solid electrolyte material. In other words, the electrolyte layer 202 may be a solid electrolyte layer.

As the solid electrolyte material included in the electrolyte layer 202, the first solid electrolyte material described above may be used.

Alternatively, a second solid electrolyte material may be used as the solid electrolyte material included in the electrolyte layer 202.

In other words, the electrolyte layer 202 may include the second solid electrolyte material.

The second solid electrolyte material is a material represented by the following composition formula (2).

$$Li_{\alpha'}M'_{\beta'}X'_{\gamma'}$$  Formula (2)

where α', β', and γ' are each independently a value greater than 0.

M' includes at least one selected from the group consisting of metalloid elements and metal elements other than Li.

X' includes at least one of Cl and Br.

According to the above configuration, the output density of the battery can be improved. In addition, thermal stability of the battery can be improved and generation of harmful gases such as hydrogen sulfide can be suppressed.

In the composition formula (2), M' may include Y (namely, yttrium).

In other words, the second solid electrolyte material may include Y as the metal element M'.

According to the above configuration, the ionic conductivity of the second solid electrolyte material can be further improved. Thereby, the charge/discharge efficiency of the battery can be further improved.

The second solid electrolyte material including Y may be, for example, a compound represented by a composition formula $Li_aMe'_bY_cX'_6$ (a+mb+3c=6 and c>0 are satisfied) (Me': at least one of metalloid elements and metal elements other than Li and Y) (m: valence of Me').

As Me', at least one selected from the group consisting of Mg, Ca, Sr, Ba, Zn, Sc, Al, Ga, Bi, Zr, Hf, Ti, Sn, Ta, and Nb may be used.

According to the above configuration, the ionic conductivity of the second solid electrolyte material can be further improved.

The second solid electrolyte material may be $Li_{2.7}Y_{1.1}Cl_6$.

According to the above configuration, the output density of the battery can be further improved.

The second solid electrolyte material may be a material represented by the following composition formula (A1).

$$Li_{6-3d}Y_dX_6$$  Formula (A1)

where, in the composition formula (A1), X is at least one selected from the group consisting of Cl and Br. In addition, in the composition formula (A1), 0<d<2 is satisfied.

According to the above configuration, the ionic conductivity of the second solid electrolyte material can be further improved. Thereby, the charge/discharge efficiency of the battery can be further improved.

The second solid electrolyte material may be a material represented by the following composition formula (A2).

$$Li_3YX_6$$  Formula (A2)

where, in the composition formula (A2), X is at least one selected from the group consisting of Cl and Br.

According to the above configuration, the ionic conductivity of the second solid electrolyte material can be further improved. Thereby, the charge/discharge efficiency of the battery can be further improved.

The second solid electrolyte material may be a material represented by the following composition formula (A3).

$$Li_{3-\delta}Y_{1+\delta}Cl_6$$  Formula (A3)

where, in the composition formula (A3), 0<δ≤0.15 is satisfied.

According to the above configuration, the ionic conductivity of the second solid electrolyte material can be further improved. Thereby, the charge/discharge efficiency of the battery can be further improved.

The second solid electrolyte material may be a material represented by the following composition formula (A4).

$$Li_{3-\delta}Y_{1+\delta}Br_6$$  Formula (A4)

where, in the composition formula (A4), 0<δ≤0.25 is satisfied.

According to the above configuration, the ionic conductivity of the second solid electrolyte material can be further improved. Thereby, the charge/discharge efficiency of the battery can be further improved.

The second solid electrolyte material may be a material represented by the following composition formula (A5).

$$Li_{3-3\delta+a}Y_{1+\delta-a}Me_aCl_{6-x}Br_x$$  Formula (A5)

where, in the composition formula (A5), Me is at least one selected from the group consisting of Mg, Ca, Sr, Ba, and Zn.

In the composition formula (A5), $-1<\delta<1$;

$0<a<2$;

$0<(3-3\delta+a)$;

$0<(1+\delta-a)$; and $0\leq x\leq 6$ are satisfied

According to the above configuration, the ionic conductivity of the second solid electrolyte material can be further improved. Thereby, the charge/discharge efficiency of the battery can be further improved.

The second solid electrolyte material may be a material represented by the following composition formula (A6).

$$Li_{3-3\delta}Y_{1+\delta-a}Me_aCl_{6-x}Br_x \quad \text{Formula (A6)}$$

where, in the composition formula (A6), Me is at least one selected from the group consisting of Al, Sc, Ga, and Bi.

In addition, in the composition formula (A6), $-1<\delta<1$;

$0<a<2$;

$0<(1+\delta-a)$; and $0\leq x\leq 6$ are satisfied

According to the above configuration, the ionic conductivity of the second solid electrolyte material can be further improved. Thereby, the charge/discharge efficiency of the battery can be further improved.

The second solid electrolyte material may be a material represented by the following composition formula (A7).

$$Li_{3-3\delta-a}Y_{1+\delta-a}Me_aCl_{6-x}Br_x \quad \text{Formula (A7)}$$

where, in the composition formula (A7), Me is at least one selected from the group consisting of Zr, Hf, and Ti.

In the composition formula (A7), $-1<\delta<1$;

$0<a<1.5$;

$0<(3-3\delta-a)$;

$0<(1+\delta-a)$; and $0\leq x\leq 6$ are satisfied

According to the above configuration, the ionic conductivity of the second solid electrolyte material can be further improved. Thereby, the charge/discharge efficiency of the battery can be further improved.

The second solid electrolyte material may be a material represented by the following composition formula (A8).

$$Li_{3-3\delta-2a}Y_{1+\delta-a}Me_aCl_{6-x}Br_x \quad \text{Formula (A8)}$$

where, in the composition formula (A8), Me is at least one selected from the group consisting of Ta and Nb.

In the composition formula (A8), $-1<\delta<1$;

$0<a<1.2$;

$0<(3-3\delta-a)$;

$0<(1+\delta-a)$; and $0\leq x\leq 6$ are satisfied

According to the above configuration, the ionic conductivity of the second solid electrolyte material can be further improved. Thereby, the charge/discharge efficiency of the battery can be further improved.

As the second solid electrolyte material, for example, $Li_3YX_6$, $Li_2MgX_4$, $Li_2FeX_4$, $Li(Al, Ga, In)X_4$, or $Li_3(Al, Ga, In)X_6$ (X is at least one selected from the group consisting of Cl and Br) can be used.

A sulfide solid electrolyte may be used as the solid electrolyte material included in the electrolyte layer 202.

In other words, the electrolyte layer 202 may include a sulfide solid electrolyte.

According to the above configuration, since the sulfide solid electrolyte excellent in reduction stability is included, a low-potential anode material such as graphite or metallic lithium can be used to improve the energy density of the battery.

As the sulfide solid electrolyte, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ can be used. In addition, LiX (X: F, Cl, Br, I), $Li_2O$, $MO_q$, or $Li_pMO_q$ (M: any of P, Si, Ge, B, Al, Ga, In, Fe, Zn) (p, q: natural number) may be added thereto.

As the solid electrolyte material included in the electrolyte layer 202, an oxide solid electrolyte, a polymer solid electrolyte, or a complex hydride solid electrolyte may be used.

Examples of the Oxide Solid Electrolyte Include a NASICON solid electrolyte such as $LiTi_2(PO_4)_3$ and its element substitution products;

a perovskite solid electrolyte such as $(LaLi)TiO_3$;

a LISICON solid electrolyte such as $Li_{14}ZnGe_4O_{16}$, $Li_4SiO_4$, or $LiGeO_4$ and its element substitution products;

a garnet solid electrolyte such as $Li_7La_3Zr_2O_{12}$ and its element substitution products;

$Li_3N$ and its H substitution products;

$Li_3PO_4$ and its N substitution products;

glass to which $Li_2SO_4$ or $Li_2CO_3$ has been added using a Li—B—C compound such as $LiBO_2$ or $Li_3BO_3$ as the base thereof; and glass ceramics.

As the polymer solid electrolyte, for example, a compound of a polymer compound and a lithium salt can be used. The polymer compound may have an ethylene oxide structure. Since the solid polymer electrolyte having an ethylene oxide structure can include a large amount of lithium salt, the ionic conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt.

As the complex hydride solid electrolyte, for example, $LiBH_4$—$LiI$ or $LiBH_4$—$P_2S_5$ can be used.

The electrolyte layer 202 may include a solid electrolyte material as a main component. In other words, the electrolyte layer 202 may include a solid electrolyte material, for example, at a weight ratio of not less than 50% (not less than 50% by weight) with respect to the entire electrolyte layer 202.

According to the above configuration, the charge/discharge characteristic of the battery can be further improved.

Further, the electrolyte layer 202 may include a solid electrolyte material, for example, at a weight ratio of not less than 70% (not less than 70% by weight) with respect to the entire electrolyte layer 202.

According to the above configuration, the charge/discharge characteristic of the battery can be further improved.

The electrolyte layer 202 may further include inevitable impurities. The electrolyte layer 202 may include the starting materials used for the synthesis of the solid electrolyte material. The electrolyte layer 202 may include by-products or decomposition products generated during the synthesis of the solid electrolyte material.

The weight ratio of the solid electrolyte material included in the first electrolyte layer 101 to the first electrolyte layer 101 may be substantially 1. "The weight ratio is substantially 1" means that the weight ratio calculated without considering inevitable impurities that may be included in the first electrolyte layer 101 is 1. In other words, the first electrolyte layer 101 may be composed only of the solid electrolyte material.

According to the above configuration, the charge/discharge characteristic of the battery can be further improved.

As described above, the electrolyte layer 202 may be composed only of the solid electrolyte material.

The electrolyte layer 202 may include two or more kinds of the materials described as the solid electrolyte material. For example, the electrolyte layer 202 may include the halide solid electrolyte material and the sulfide solid electrolyte material.

The thickness of the electrolyte layer 202 may be not less than 1 μm and not more than 300 μm. If the thickness of the electrolyte layer 202 is less than 1 μm, a possibility that the cathode 201 and the anode 203 are short-circuited increases. In addition, if the thickness of the electrolyte layer 202 is more than 300 μm, it may be difficult to operate at a high output.

The anode 203 includes a material having a property of occluding and releasing metal ions (for example, lithium ions). The anode 203 includes, for example, an anode active material.

A metal material, a carbon material, an oxide, a nitride, a tin compound, or a silicon compound can be used as the anode active material. The metal material may be a single metal. Alternatively, the metal material may be an alloy. Examples of the metal material include lithium metal and lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound can be preferably used.

The anode 203 may include a solid electrolyte material. According to the above configuration, the lithium ion conductivity inside the anode 203 is increased to allow operation at a high output. As the solid electrolyte material, materials exemplified as the electrolyte layer 202 may be used.

The median diameter of the anode active material particles may be not less than 0.1 μm and not more than 100 μm. If the median diameter of the anode active material particles is smaller than 0.1 μm, the anode active material particles and the solid electrolyte material are not well dispersed in the anode, so that the charge/discharge characteristic of the battery may be lowered. On the other hand, if the median diameter of the anode active material particles is larger than 100 μm, the diffusion of lithium in the anode active material particles is made slow. As a result, the battery may be difficult to operate at a high output.

The median diameter of the anode active material particles may be larger than the median diameter of the solid electrolyte material. Thereby, the anode active material particles and the solid electrolyte material can be well dispersed.

In the anode 203, a volume ratio Vn representing a volume of the anode active material particles to the total volume of the anode active material particles and the solid electrolyte material may be not less than 0.3 and not more than 0.95. If the volume ratio Vn is less than 0.3, it may be difficult to ensure an energy density of the battery sufficiently. On the other hand, if the volume ratio Vn exceeds 0.95, the battery may be difficult to operate at a high output.

The thickness of the anode 203 may be not less than 10 μm and not more than 500 μm. If the thickness of the anode is less than 10 μm, it may be difficult to ensure an energy density of the battery sufficiently. In addition, if the thickness of the anode is more than 500 μm, it may be difficult to operate at high output.

The cathode 201 may include a solid electrolyte material for the purpose of improving the ionic conductivity. As the solid electrolyte material, materials exemplified as the electrolyte layer 202 may be used.

At least one of the cathode 201, the electrolyte layer 202, and the anode 203 may include a binder for the purpose of improving adhesion between the particles. The binder is used in order to improve the binding property of the material which forms the electrode.

An example of the binder is polyvinylidene fluoride, polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, or carboxymethylcellulose.

As the binder, a copolymer of two or more kinds of materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene can be used.

Two or more kinds of the binders can be used.

At least one of the cathode 201 and the anode 203 may include a conductive assistant for the purpose of increasing the electronic conductivity. Examples of the conductive assistant include:
graphite such as natural graphite or artificial graphite;
carbon black such as acetylene black or ketjen black;
a conductive fiber such as a carbon fiber or a metal fiber;
carbon fluoride;
metal powder such as aluminum;
conductive whiskers such as zinc oxide or potassium titanate;
a conductive metal oxide such as titanium oxide; and
a conductive polymer compound such as polyaniline, polypyrrole, or polythiophene.

Cost reduction can be achieved by using carbon conductive assistant.

The battery in the second embodiment can be configured as a battery having various shapes such as a coin shape, a cylindrical shape, a prism shape, a sheet shape, a button shape, a flat shape, or a stacked shape.

EXAMPLES

Hereinafter, details of the present disclosure will be described with reference to inventive examples and comparative example.

Inventive Example 1

[Production of First Solid Electrolyte Material]

In an argon glove box with a dew point of −60° C. or less, raw material powders LiCl, YCl$_3$, YBr$_3$, and LiI were prepared at a molar ratio of LiCl:YCl$_3$:YBr$_3$: LiI=6:2:1:3. Subsequently, milling processing was performed at 600 rpm for 25 hours using a planetary ball mill (manufactured by Fritsch, type P-7) to provide a powder of the first solid electrolyte material Li$_3$YBrCl$_4$I.

[Production of Cathode Material]

In the argon glove box, the first solid electrolyte material of the inventive example 1 and the cathode active material LiFePO$_4$ were prepared at a weight ratio of 80:20. The cathode material of the inventive example 1 was produced by mixing these in an agate mortar.

Inventive Example 2

[Production of First Solid Electrolyte Material]

In an argon glove box with a dew point of −60° C. or less, raw material powders LiBr, LiCl, LiI, YCl$_3$, and YBr$_3$ were prepared at a molar ratio of LiBr:LiCl:LiI:YCl$_3$:YBr$_3$=1:1:4:1:1. Subsequently, milling processing was performed at 600 rpm for 25 hours using a planetary ball mill (manufactured by Fritsch, P-7 type) to provide a powder of the first solid electrolyte material Li$_3$YBr$_2$Cl$_2$I$_2$.

Except for the matters set forth in the section of the production of the first solid electrolyte material, a method similar to that of the inventive example 1 was performed to provide a cathode material of the inventive example 2.

Inventive Example 3

A method similar to that of the inventive example 2 was performed to provide a cathode material of the inventive example 3.

Inventive Example 4

A method similar to that of the inventive example 2 was performed to provide a cathode material of the inventive example 4.

Comparative Example 1

Li(NiCoMn)O$_2$ was used as a cathode active material.

Except for this matter, a method similar to that of the inventive example 2 was performed to provide a cathode material of the comparative example 1.

[Production of Second Solid Electrolyte Material]

In an argon glove box with a dew point of −60° C. or less, raw material powders LiCl and YCl$_3$ were prepared at a molar ratio of LiCl:YCl$_3$=2.7:1.1. Subsequently, milling processing was performed at 600 rpm for 25 hours using a planetary ball mill (manufactured by Fritsch, type P-5) to provide a powder of the second solid electrolyte material Li$_{2.7}$Y$_{1.1}$Cl$_6$.

[Production of Sulfide Solid Electrolyte Material]

In an argon glove box having an Ar atmosphere with a dew point of −60° C. or less, Li$_2$S and P$_2$S$_5$ were prepared at a molar ratio of Li$_2$S:P$_2$S$_5$=75:25. These were ground and mixed in a mortar. Subsequently, a glassy solid electrolyte was provided by milling processing at 510 rpm for 10 hours using the planetary ball mill (manufactured by Fritsch, P-7 type). The glassy solid electrolyte was heat-treated at 270° C. for 2 hours in an inert atmosphere. Thus, a glass ceramic solid electrolyte Li$_2$S—P$_2$S$_5$ was provided.

[First Production of Secondary Battery]

The batteries of the inventive example 1, the inventive example 2, and the comparative example 1 were produced using the cathode materials of the inventive examples 1 and 2 and the comparative example 1, respectively, with the glass ceramic solid electrolyte Li$_2$S—P$_2$S$_5$, by the following method.

First, a glass ceramic solid electrolyte Li$_2$S—P$_2$S$_5$ (80 mg) and the cathode material (10 mg) were stacked in this order in an insulating outer cylinder. This was pressure-molded at a pressure of 360 MPa to provide a stacking structure having a solid electrolyte layer and a cathode. The cathode was located on a front surface of the solid electrolyte layer.

Next, aluminum powder (20 mg) was stacked on the front surface of the cathode. This was pressure-molded at a pressure of 360 MPa to provide the cathode with a current collector.

Next, a metal In (thickness: 200 μm) was stacked on a back surface of the solid electrolyte layer. This was pressure-molded at a pressure of 80 MPa to produce a stacking structure having the cathode, the solid electrolyte layer, and an anode.

Next, stainless steel current collectors were disposed on the upper and lower parts of the stacking structure, and current collector leads were attached to the current collectors.

Finally, an insulating ferrule was used to block and seal the inside of the insulating outer cylinder from the outside atmosphere. In this way, a battery was produced.

Thus, the batteries of the inventive example 1, the inventive example 2, and the comparative example 1 were produced.

[Second Production of Secondary Battery]

Using the cathode material of the inventive example 3 and the halide solid electrolyte Li$_3$YBr$_2$Cl$_2$I$_2$, a battery of the inventive example 3 was produced by the following method.

First, a halide solid electrolyte Li$_3$YBr$_2$Cl$_2$I$_2$ (80 mg) and the cathode material of the inventive example 3 (10 mg) were stacked in this order in an insulating outer cylinder. This was pressure-molded at a pressure of 360 MPa to provide a stacking structure having a cathode and a solid electrolyte layer. The cathode was located on the front surface of the solid electrolyte layer.

Next, aluminum powder (20 mg) was stacked on the front surface of the cathode. This was pressure-molded at a pressure of 360 MPa to provide the cathode with a current collector.

Next, a metal In (thickness: 200 μm) was stacked on a back surface of the solid electrolyte layer. This was pressure-molded at a pressure of 80 MPa to produce a stacking structure composed of the cathode, the solid electrolyte layer, and an anode.

Next, stainless steel current collectors were disposed on the upper and lower parts of the stacking structure, and current collector leads were attached to the current collectors.

Finally, an insulating ferrule was used to block and seal the inside of the insulating outer cylinder from the outside atmosphere. In this way, a battery was produced.

Thus, the battery of the inventive example 3 was produced.

[Third Production of Secondary Battery]

Using the cathode material of the inventive example 4 and the halide solid electrolyte $Li_{2.7}Y_{1.1}Cl_6$, a battery of the inventive example 4 was produced by the following method.

First, a halide solid electrolyte $Li_{2.7}Y_{1.1}Cl_6$ (80 mg) and the cathode material (10 mg) of the inventive example 4 were stacked in this order in an insulating outer cylinder. This was pressure-molded at a pressure of 360 MPa to provide a stacking structure having a cathode and a solid electrolyte layer. The cathode was located on the front surface of the solid electrolyte layer.

Next, aluminum powder (20 mg) was stacked on the front surface of the cathode. This was pressure-molded at a pressure of 360 MPa to provide the cathode with a current collector.

Next, a metal In (thickness: 200 μm) was stacked on the back side of the solid electrolyte layer. This was pressure-molded at a pressure of 80 MPa to produce a stacking structure composed of the cathode, the solid electrolyte layer, and an anode.

Next, stainless steel current collectors were disposed on the upper and lower parts of the stacking structure, and current collector leads were attached to the current collectors.

Finally, an insulating ferrule was used to block and seal the inside of the insulating outer cylinder from the outside atmosphere. In this way, a battery was produced.

Thus, the battery of the inventive example 4 was produced.

[Charge/Discharge Test 1]

The following charge/discharge tests were performed using the batteries of the inventive examples 1 to 3.

Each of the batteries were placed in a thermostatic chamber at 25° C.

Each of the batteries was charged with a constant current at a current value of 16 μA, which was 0.05° C. rate (20 hour rate) with respect to the theoretical capacity of each of the batteries, and the charge was terminated at a voltage of 3.0 V.

Next, each of the batteries was discharged at a current value of 16 μA, which was 0.05° C. rate, and the discharge was terminated at a voltage of 1.9 V.

Thus, the initial charge/discharge efficiency (=initial discharge capacity/initial charge capacity) of each of the batteries of the inventive examples 1 to 3 was provided. The results are shown in Table 1 below. The metal In, which was used for the anodes of the batteries of the inventive examples 1 to 3, exhibits a potential of 0.6 volts with respect to lithium.

In other words, the end-of-charge voltage of 3.0 V and the end-of-discharge voltage of 1.9 V in the batteries of the inventive examples 1 to 3 are converted into electric potentials based on Li of 3.6 V vs. Li and 2.5 V vs. Li, respectively.

[Charge/Discharge Test 2]

Using the battery of the inventive example 4, a charge/discharge test was performed under the following conditions.

The battery was placed in a thermostatic chamber at 25° C.

The battery was charged with a constant current at a current value of 16 μA, which was 0.05 C rate (20 hour rate) with respect to the theoretical capacity of the battery, and the charge was terminated at a voltage of 3.4 V.

Next, the battery was discharged at a current value of 16 μA, which was 0.05 C rate, and the discharge was terminated at a voltage of 1.9 V.

Thus, the initial charge/discharge efficiency (=initial discharge capacity/initial charge capacity) of the battery of the inventive example 4 was provided. The result is shown in Table 1 below. The metal In, which was used for the anode of the battery of the inventive example 4, exhibits a potential of 0.6 vs. Li.

In other words, the end-of-charge voltage of 3.4 V and the end-of-discharge voltage of 1.9 V in the battery of the inventive example 4 are converted into electric potentials based on Li of 4.0 V vs. Li and 2.5 V vs. Li, respectively.

[Charge/Discharge Test 3]

Using the battery of the comparative example 1, a charge/discharge test was performed under the following conditions.

The battery was placed in a thermostatic chamber at 25° C.

The battery was constant-current charged at a current value of 20 μA, which was 0.05 C rate (20 hour rate) with respect to the theoretical capacity of the battery, and the charge was terminated at a voltage of 3.6 V.

Next, the battery was discharged at a current value of 20 μA, which was 0.05 C rate, and the discharge was terminated at a voltage of 1.9 V.

Thus, the initial charge/discharge efficiency (=initial discharge capacity/initial charge capacity) of the battery of the comparative example 1 was provided. The result is shown in Table 1 below. The metal In, which was used for the anode of the battery of the comparative example 1, exhibits a potential of 0.6 vs. Li.

In other words, the end-of-charge voltage of 3.6 V and the end-of-discharge voltage of 1.9 V in the battery of the comparative example 1 are converted into electric potentials based on Li of 4.2 V vs. Li and 2.5 V vs. Li, respectively.

TABLE 1

| | Maximum charge electric potential (V vs. Li/Li+) | Cathode Active Material | First Solid Electrolyte Material | Electrolyte Layer | Charge/Discharge Efficiency (%) |
|---|---|---|---|---|---|
| Inventive Example 1 | 3.6 | $LiFePO_4$ | $Li_3YBrCl_4I$ | $Li_2S$—$P_2S_5$ | 75.0 |
| Inventive Example 2 | 3.6 | $LiFePO_4$ | $Li_3YBr_2Cl_2I_2$ | $Li_2S$—$P_2S_5$ | 61.5 |
| Inventive Example 3 | 3.6 | $LiFePO_4$ | $Li_3YBr_2Cl_2I_2$ | $Li_3YBr_2Cl_2I_2$ | 51.5 |
| Inventive Example 4 | 4 | $LiFePO_4$ | $Li_3YBr_2Cl_2I_2$ | $Li_{2.7}Y_{1.1}Cl_6$ | 68.1 |
| Comparative Example 1 | 4.2 | $Li(NiCoMn)O_2$ | $Li_3YBr_2Cl_2I_2$ | $Li_2S$—$P_2S_5$ | 36.8 |

DISCUSSION

From the results of the inventive example 2 and the comparative example 1, which are shown in Table 1, it was confirmed that the charge/discharge efficiency of the battery is improved by using the cathode material including the first solid electrolyte material and the cathode active material LiFePO$_4$.

From the results of the inventive examples 1 and 2, it was confirmed that the charge/discharge efficiency of the battery is improved, even if a different first solid electrolyte material is used as the cathode solid electrolyte.

From the results of the inventive examples 2, 3, and 4, even if the first solid electrolyte material or the second solid electrolyte material is used for the solid electrolyte layer, it was confirmed that the charge/discharge efficiency of the battery is improved, similarly to the case where a sulfide solid electrolyte is used for the solid electrolyte layer.

INDUSTRIAL APPLICABILITY

The battery of the present disclosure can be used as, for example, an all solid lithium secondary battery.

REFERENTIAL SIGNS LIST

1000 Cathode material
100 First solid electrolyte particle
110 Cathode active material particle
2000 Battery
201 Cathode
202 Electrolyte layer
203 Anode

The invention claimed is:

1. A battery comprising:
   a cathode including a cathode material comprising:
      a cathode active material comprising lithium iron phosphate; and
      a first solid electrolyte material including Li, Y, and X, and not including sulfur;
   an anode; and
   an electrolyte layer including a second solid electrolyte material provided between the cathode and the anode,
   wherein
   the first solid electrolyte material is represented by the following composition formula:

$Li_{6-3d}Y_dX_6$, wherein
   X represents at least one selected from the group consisting of Cl and Br, and I, and
   0<d<2 is satisfied, and
   the second solid electrolyte material is represented by the following composition formula:

$Li_{6-3d'}Y_{d'}X'_6$, wherein
   0<d'<2 is satisfied, and
   X' includes at least one selected from the group consisting of Cl and Br.

2. The battery according to claim 1, wherein the first solid electrolyte material is $Li_3YBrCl_4I$ or $Li_3YBr_2Cl_2I_2$.

3. The battery according to claim 1, wherein the second solid electrolyte material is $Li_{2.7}Y_{1.1}Cl_6$.

* * * * *